United States Patent [19]

Rudel

[11] Patent Number: 4,961,937
[45] Date of Patent: Oct. 9, 1990

[54] A COMPOSITION OF FLOURS CONTAINING VITAL GLUTEN AND SOLUBLE OAT DIETARY FIBER AND A BAKED PRODUCT PRODUCED THEREFROM

[76] Inventor: Harry W. Rudel, 801 N. Broad St., Elizabeth, N.J. 07208

[21] Appl. No.: 276,408

[22] Filed: Nov. 22, 1988

[51] Int. Cl.$^5$ ............................................. A21D 13/00
[52] U.S. Cl. .................................... 426/19; 426/549; 426/551; 426/552; 426/554; 426/555
[58] Field of Search ............... 426/549, 551, 552, 554, 426/555, 561, 562, 622, 18, 19, 20, 21, 27, 61, 62, 653, 106, 128

[56] References Cited

U.S. PATENT DOCUMENTS

| | | | |
|---|---|---|---|
| 224,998 | 3/1880 | Dart | 426/551 |
| 1,964,940 | 7/1934 | Epstein | 426/549 |
| 2,355,028 | 8/1944 | Musher | 426/627 |
| 2,355,030 | 8/1944 | Musher | 426/582 |
| 2,355,547 | 8/1944 | Musher | 426/567 |
| 2,487,069 | 11/1949 | Musher | 426/549 |
| 3,219,455 | 11/1965 | Dubois | 426/26 |
| 3,362,829 | 1/1968 | Landfried | 426/622 |
| 3,407,078 | 10/1968 | Schlichter | 426/418 |
| 3,497,360 | 2/1970 | Schaefer | 426/21 |
| 3,574,634 | 4/1971 | Singer | 426/20 |
| 4,007,289 | 2/1977 | Jaeckering | 426/549 |
| 4,109,018 | 8/1978 | Thompson | 426/21 |
| 4,357,356 | 11/1982 | Joulin | 426/128 |
| 4,395,426 | 7/1983 | Fan | 426/2 |
| 4,481,222 | 11/1984 | Fan | 426/19 |
| 4,587,126 | 5/1986 | Patton | 426/19 |
| 4,604,289 | 8/1986 | Spanier | 426/21 |
| 4,769,245 | 9/1988 | Farrai | 426/106 |
| 4,824,683 | 4/1989 | Hodgson et al. | 426/653 |

FOREIGN PATENT DOCUMENTS

| | | | |
|---|---|---|---|
| 0141653 | 5/1985 | European Pat. Off. | 426/19 |
| 129614 | 1/1978 | Fed. Rep. of Germany | 426/128 |
| 160177 | 5/1983 | Fed. Rep. of Germany | 426/128 |
| 8700506 | 1/1987 | PCT Int'l Appl. | 426/128 |
| 14288 | 8/1899 | United Kingdom | 426/128 |
| 953523 | 1/1963 | United Kingdom | 426/128 |
| 1008679 | 11/1965 | United Kingdom | 426/128 |

OTHER PUBLICATIONS

Kent-Jones, 1957, Modern Cereal Chemistry, 5th Edition, p. 110, The Northern Publishing Co., Ltd., Liverpool, England.
Plyer, 1948, The Staling of Bread, The Baker Digest XXII, 6, pp. 21–23, 34.
Oomah, 1983, Cereal Chemistry 60(3)220.
D'Appolonia, 1978, Cereal Chem. 55(5)736.
Plyer, 1973, Baking Science and Technology, vol. 1, Siebel Publishing Co., Chicago, Ill., pp. 384–386.
Peterson, 1978, Encyclopedia of Food Science, AVI Publishing Co., Inc., Westport, Ct., pp. 350–352.
Schenz et al., (editor), 1986, Food Composition and Nutrition Tables, 1986/1987, Wassenschaftliche Verlagsgesellschaft, pp. 480–486, 515–519.

*Primary Examiner*—Carolyn Paden
*Attorney, Agent, or Firm*—Lerner, David, Littenberg

[57] ABSTRACT

A composition of natural ingredients is disclosed which consists of a milled oat groat product and high gluten wheat flour. The composition may also contain one or more diluents of other natural grain products. The use of the composition in the manufacture of both yeast and chemically leavened baked goods results in products which do not stale and have extended keeping qualities, are nutritionally superior due to high protein and dietary fiber content and are reduced in calories. Disclosed herein are dry mixes for preparing baked goods, doughs and batters made by the addition of liquid to the dry mixes and baked goods prepared from the doughs.

28 Claims, No Drawings

A COMPOSITION OF FLOURS CONTAINING VITAL GLUTEN AND SOLUBLE OAT DIETARY FIBER AND A BAKED PRODUCT PRODUCED THEREFROM

BACKGROUND OF THE INVENTION (1) Field of Invention
Class:
426 Food or Edible Material: Processes, Compositions and Products
804 Low Calorie, Low Sodium, Hypoallergic
808 Starch Base Snack Product
810 Energy Rations, e.g. Emergency Rations, Survival Rations, etc..
800 Geriatric
801 Pediatric (2) Background Art Many and varied efforts have been made to increase the keeping time of bread and other baked goods and to retard the staling process. In connection with these researches and in researches involving nutritional changes, many substances have been added to breads and baked goods with varying results. A detailed look at each of these areas has provided the background for the instant invention.

Staling is a function of starch. It is a process of retrogradation involving the alignment and association of the linear starch molecules, amyloses, over a period of time resulting in firmness and reduction in soluble dextrin, characteristics of stale crumb. During the past century there have been a variety of approaches to the problem of staling. These can be classified into four categories (1) diluents (2) humectants (3) crumb softeners and (4) enzyme removers of amylose. Pertinent patents from 1877 through 1987 are illustrative of the categories. None of these approaches has been successful in eliminating staling in standard baked goods whose principal ingredient is wheat flour. Successes have been limited to delaying by a few days the onset of staling as evidenced by crumb firmness.

DILUENTS

The earliest attempts to delay staling and increase the keeping time of bread were with diluents of bread flour, beginning with banana pulp (Schrader, U.S. #373,690, Nov. 22, 1887). This approach has continued to the present, most recently with the use of corn starch or flour from the waxy-sugary 2 genotype (WxSu$_2$) corn, a grain high in amylopectin (Zallie et al. U.S. #4,615,888, Oct. 7, 1986). Dilution is limited to 1-15% of the flour weight. Amounts in excess of this cause both unacceptable reductions in bread volume and changes in crumb characteristics. It is generally accepted that diluents have an effect on firming or aging of bread. Roewe, et al. (Staling of variety breads. Lebensmittel Wissenschif und Technologie 15 (5) 263-266, 1982) comparing firming changes of variety breads to white pan bread, found that overall firmness changes of the former were less rapid than those of the latter. This was restricted to dilution of starch by other ingredients and/or grain components. Diluents, per se, by lessening the concentration of amylose, can have an effect on firming associated with staling directly related to the amount of dilution. More pertinent is the dilution of gluten and the weakening of crumb structure to produce initially a softer more compressible bread. As with other anti-staling agents, the rate of staling may not be affected as much as the base-line from which changes in bread compressibility are measured.

Dehme (U.S. #3,193,389, July 6, 1965) found that loaves made with flour diluted with amylopectin in amounts of 5-30% of the weight of flour would remain fresh 3-4 times the ordinary period of freshness of the same bread without the additive. Amylopectin, because of its branched molecular structure, is less likely to cross-link and produce staling than amylose. Although 5-10% substitution levels are reported to have an effect, the dense loaves obtained ( specific vol. 1.7 cc/g in contrast to ordinary bread specific volume of 5.5 cc/g) would indicate that higher levels of amylopectin, probably 10-30%, are necessary to produce the reported effect on staling. The lengthy processing, 18-30 hours of baking at 100° C. and a cooling period of 6 hours to structurally stabilize the soft mass associated with the previously mentioned limited increase in the processed dough volume (10% greater than the pre-baked mass) indicate that the material is not a bread but an amylopectin starch pudding, resistant to gel formation, a characteristic of amylopectin. That the loaves will keep for 7 days with ordinary wrappings is consistent with the property of increased water binding exhibited by amylopectin. Loaves prepared by this method can be kept up to 12 months following a procedure of surface moistening, vacuum packaging in plastic foil and sterilization. Not only is the lack of bread quality of this product a handicap to general acceptance, but the multi-step and prolonged processing time is not practical for a cost sensitive high volume product. Finally, the method creates a further reduction in protein and dietary fiber in a basic food stuff already suffering from over refinement.

Like amylopectin, there are other additives which in addition to their diluent effect act to hold water, improving the keeping quality of bread by moisture retention not by retardation of staling. Biber (U.S. #778,166, Dec. 20, 1904) used Sago meal or flour treated with water to form a jelly. When mixed with bread and water, a dough is formed which can be baked into the bread. The Sago used in this bread is a gelantinized starch capable of holding considerable water. This produces a heavier wetter loaf, which because of its greater water content, will remain moist longer.

Johnson (U.S. #1,262,506, Apr. 9, 1918) used gelatinized corn starch (4.6% of the wheat flour) combined with malted barley and cane sugar. The gelantinized starch has a high capacity for holding water, thus tending to keep the loaf moist longer. The combination ferments to produce dextrins and CO$_2$. The dextrins, due to their gum-like properties, act to hold gas during leavening.

Dextrins are polysaccharicles of glucose molecules having the same 1-4 linkage as starch. Dextrins result from the partial hydrolysis of the starch molecules through the action of heat, acids or enzymes. The molecular weights of dextrins vary considerably, but are always lower than the molecular weight of the original starch molecules.

Dextrans of molecular weights of 20 million to about 40 million have been claimed as additives to soften the gluten contained in farinaceous doughs and to increase the specific volume of the resultant bakery product (Bohn, U.S. #2,983,613, May 9, 1961). Bread made with these dextrans in amounts of 3 parts per 100 parts of flour were 20% greater in volume, had a softer crumb and were more moist than control loaves. After three days the additive containing loaves were more compressible than the controls, because of the initially softer crumb. The rate of firming was greater for the treated loaves. There were approximately 4 parts of additional water needed to make the dough for each part of dextran. One part of dextran for each 10 parts of vital gluten was reported to soften or make fluid a gluten water mixture.

Dextrans, a group of polysaccharides composed of glucose, are secreated by certain strains of bacteria as slimes. Although their structures vary with the strain of microorganism they are branched polysaccharides having 1-6 and 4-1 linkages.

Janosi, et al. (U.S. #4,382,096, May 3, 1983) describe a process using cornflake flour (5-6.5% based on wheat flour) obtained from the steam treatment of crushed corn kernels or corn flour. The bread obtained with this gelatinized corn starch has a softer crumb and longer moisture retention than ordinary white bread.

Although moistness of bread and other baked goods may be a positive feature from the stand point of user acceptance, a water activity (Aw) in excess of 0.85 can permit microbial growth and thereby is a negative influence on prolonged keeping time.

HUMECTANTS

Before the process of staling was understood as it is today, the dryness associated with the staled crumb of baked goods led to the use of hydrocolloidal vegetable gums as humectants or moisturizers. These agents take up and hold water in amounts many times their own weight. As an example, the uptake of water by alginates is 26 cc/g, in contrast to gluten, 1 cc/g, undamaged starch, 0.4 cc/g and damaged starch up to 2 cc/g. It should be emphasized that these agents are not to be considered as anti-stalants even though Andt (U.S. #3,271,164, Sept. 6, 1966) describes "An Additive for Baked Goods to Retard Staling" as a mixture of karaya gum and from 2% to 20% based on the additive weight, a material selected from the group of algins and carrageenins. Loaves treated with 0.5% of the additive showed a greater softness initially and after 96 hours when compared to a control bread. The rate of firming for additive and control loaves was similar. Moisture content was slightly higher in the additive loaves than in the controls. It remained constant after 96 hours in the additive loaves but was slightly reduced in the controls.

Others, claiming improvements from hydrocolloidal vegetable gums, describe better keeping qualities due to moisture retention and softness, (Curtner U.S. Pat No. 1,524,783, Feb. 3, 1925; Epstein U.S. #1,964,940, July 3, 1934; Ament U.S. #2,158,392, May 16, 1939). The other aspects of hydrocolloidal vegetable gums which relate to bread quality, are not pertinent to this discussion. Although hydrocolloidal vegetable gums affect crumb softness they have not found a place in bread making for this purpose.

CRUMB SOFTNERS

Chemical emulsifiers and surfactants have been shown to increase initial bread softness. These agents include the mono- and diglycerides of fatty acids, esters of diacetyl tartaric acid, propylene glycol and succinic acid, ethoxylated mono- and diglycerides, polyoxyethylene sorbitan monostearate, sodium stearoyl-2 lactylate and calcium stearoyl-2 lactylate. These agents have been found to effect keeping time of bread, but claims of reducing bread staling are not precise. These agents do not reduce the rate of bread staling, using bread firming as the index, but merely increase initial bread softness as the base line upon which subsequent firming is measured. It has been hypothesized from laboratory observations that monoglycerides and other emulsifiers and surfactants complex with the amylose fraction of starch preventing retrogradation. Others, because of the observations on the softening effect of lipases (Johnson and Welch U.S. #3,368,903, Feb. 13, 1968), suggest that monoglycerides may be preferentially bound to the wheat protein. The increased softening of bread treated with this class of additives lends support to the latter theory.

ENZYMES (REMOVERS OF AMYLOSE)

Enzymes such as bacterial or fungal amylases have been suggested as anti-stalants. These agents are relatively heat stable and are able to hydrolize the gelatinized amylose fraction in the baking process. When a sufficient number of amylose molecules have been hydrolyzed the molecular alignment potential is reduced and thereby so is staling. The reaction time is critical, excessive action can produce gumminess, and even crumb destruction; too little action, no effect. Stone (U.S. #2,615,810, Oct. 28, 1952) suggested a heat stable alpha amylase for this purpose. Lesser heat resistant alpha amylase, stabilized in sugar solutions, has been claimed by Cole (U.S. #4,416,903, Nov. 22, 1983 and U.S. #4,320,151, Mar. 16, 1982) to permit destruction of the enzyme during the baking process. An initial increase in loaf compressibility is noted. Bread firming increases as a function of time over the 72 hours of observation.

Carrol et al. (U.S. #4,654,216 Mar. 31, 1987) claims a combination of alpha amylase and pullulanase to correct gumminess. However, over-softening of the bread is still a problem.

Enzyme treatment of bread has not been accepted by the commercial baker because of insufficient benefits as compared to risks. The limited extension of shelf-life obtained with enzyme treatment is not warranted by the risk of a loss of a commercial run through incorrect usage of the additive and the lack of user acceptance of the final product due to crumb changes.

Significantly increasing the keeping time of bread remains a desire in search of a new approach.

NUTRITIONAL CHANGES IN BREAD MAKING

The amount of vital gluten which can be added to wheat flour with a 12.5% gluten content is limited to about 3% of the flour by weight to produce workable doughs and acceptable breads. The use of cellulostic filler to reduce the caloric content of bread has permitted the addition of gluten flour in amounts greater than 5% to increase the total gluten content and the dough strength lost by flour dilution. This concept has resulted in a series of inventions but the breads made using their teachings have not been able to combine caloric reduction with an increased gluten content and still provide a bread capable of being manufactured with existing equipment and have consumer acceptability. Several inventions have also claimed products which have an extended shelf-life, but most for only slightly longer than that for presently marketable baked goods. Where their products have a more extended shelf-life, inventions have required special processing methods or have resulted in a less desirable or unconventional product.

Singer (U.S. #3,574,634 - Apr. 13, 1971) describes a low calorie loaf containing less than 15% assimilable carbohydrate whose dry ingredients are gluten flour (50 parts) non - nutritive cellulostic filler (10-50 parts) and vegetable gum (1-10 parts). The product is reported to resemble products prepared with conventional flours. The use of non-nutritive filler and binder is said to make the otherwise dense, rubbery dough workable. The invention specifies a gluten to fiber ratio of 5:1 to 1:1, a ratio far in excess of that taught in subsequent patents in this area. Based upon these later observations, the excessively high gluten content of the Singer invention would produce a loaf with an unacceptably tough chewy crumb. The reduced or absent carbohydrate content of the product makes it difficult to achieve a normal browning reaction in baking and makes toasting impossible. Nutritionally the product of the Singer invention is inferior in its content of natural soluble dietary fiber and complex carbohydrates of grain which are important to health maintenance. The excessive levels of insoluble dietary fiber, particularly alpha cellulose or microcrystalline cellulose used in this product could cause intestinal dysfunction and even pathology since these materials when used in amounts of about 60 g/day have been associated with fecal impaction and intestinal obstruction. Finally, the tough gluten dough is difficult to adapt to commercial bread processing equipment.

Lynn (U.S. #3,697,290 Oct. 10, 1972) describes a chemically leavened loaf made from a cooked mixture of non-elastic protein (oil seed protein such as sesame and or soy), vegetable oil, vegetables and flavoring thickened with farina or other starches, which in turn, is combined with an elastic protein, wheat gluten and optionally a vegetable gum. An additional option is the use of milk solids and/or eggs to enrich the protein content. The product of this invention is not strictly a bread made from a cellulostic fiber dilution of flour with gluten flour replacement. The resultant loaf is essentially a chemically leavened high protein baked piece containing from 24-27% protein and about 24-30% carbohydrate resembling a vegetable souffle or cake. There is a reported lengthening of the shelf-life of this product of about 2-3 times over conventional breads However, the high level of water, the presence of milk, eggs and vegetable shortening are detrimental to prolonged keeping times without special precautions in preparation, processing, packaging and the use of preservatives. The process used in the preparation of this product is completely different from the conventional baking process and requires a special production facility.

Tsantsir and Gorman (U.S. #3,767,423, Oct. 23, 1973) claim a composition for use in making a low calorie bread in which the wheat flour is diluted with rice and/or soy hulls, up to 20 parts for each 10 parts of flour. Even though, in a subsidiary claim, this dilution with rice and/or soy hulls was reduced to 12 parts for each 10 parts of flour, the actual practice as furnished in their examples further reduced the dilution factor from 1.2 to about 4.5 parts of hulls for each 10 parts of flour. Gluten addition is recommended up to 10.6 parts per 10 parts of flour. In practice the preferred amounts of gluten addition are about 2.5 parts or less per 10 parts of flour, compensating for the gluten dilution of the flour by the hulls. The inventors devised an index of user acceptability for the product, "The Hedonic Index" which is inversely proportional to the wheat gluten content of the product. As with the Singer invention, the non-nutritive filler used by Tsantsir and Gorman is deficient in soluble fiber.

Titcomb (U.S. #3,979,523 - Sept. 7, 1976) describes a reduced calorie loaf with 22-25 parts by weight of alpha-cellulose and 10 parts by weight of wheat gluten per 100 parts by weight of wheat flour. Subsequently, Titcomb (U.S. #4,590,076 - May 20, 1986) modified his earlier invention specifying that at least 70% of the alpha-cellulose particles pass a 200 mesh screen. Although the amount of alpha - cellulose dilution of the bread flour was maintained at the 22-25% level specified in the earlier patent, the amount of wheat gluten was reduced to at least 5% of the flour or sufficient to substantially replace the protein lost in the product by dilution with alpha-cellulose. This reduction in the amount of wheat gluten reflects the results of the user acceptability tests of the product as described in the more recent patent. It also shows that these cellulose additives, alpha-cellulose and microcrystalline cellulose are only having a dilution effect on the gluten content of wheat flour and not a specific effect on protein binding It should be stressed that alpha-cellulose as a wood pulp derivative is not only aesthetically unacceptable, but like microcrystalline cellulose, it is an insoluble fiber capable of causing intestinal dysfunction if used indiscreetly. This lack of nutritional value and potentional hazard is recognized by the scientific community and it has been prohibited as a food additive in some countries of Europe.

Thompson (U.S. #4,109,018 - Aug. 22, 1978) found the quantitative relationship between alpha-cellulose and vital wheat gluten as well as the limits of these ingredients admixed with wheat flour to be similar to these specifications in the Titcomb invention. Thompson claims a dough for making a bread product having 3-9 parts of vital wheat gluten and 10-20 parts of an alpha-cellulose flour per 100 parts of wheat flour. The Thompson invention differs from the Titcomb disclosures by claiming the addition of 0.5 -6.0 parts of an hydrophilic gum and 5-12 parts of a protein material which increases the moisture content to about 43%, in contrast to about 36% for conventional bread. This combination of cellulose, vital wheat gluten and hydrophilic gum, the embodiments of the Singer invention, are used as an additive. The non elastic protein material, other than its nutritional value, has no significance in the bread formula. The vegetable gum in combination with alpha-cellulose has more than enough hygroscopicity to account for the additional water retention in the bread of the Thompson invention. The breads made following this invention suffer the same disadvantages of other breads using alpha-cellulose as a source of dietary fiber. As mentioned previously the higher water content as it relates to increased water activity of the baked product is detrimental to a prolonged shelf-life.

Patton et al. (U.S. #4,587,126 - May 6, 1968) produced a reduced calorie bread using from 5-20% of citrus vesicle fibers per 100 lb. of wheat flour having about 14% protein content. This bread has about 45-52% moisture content and less than 60 calories per ounce (2.1 cal./g). Its protein content of about 10% is achieved by the addition of gluten in the amount of 5% and oat flour in the amount of 15% based upon the weight of the flour. The use of citrus vesicle fibers as a diluent of bread flours allows for the retention of greater amounts of absorbed water during the baking cycle than does alpha-cellulose. The high water content reinforces the fiber dilution of the assimilable nutrients of bread, permitting a label claim of a reduced calorie content, but serves little to enhance the nutritional value of the product. The deleterious effect of water on keeping time is an additional negative feature.

Although it was stated that the absence of bucky dough and tough crumb associated with gluten flour is attributed to the citrus vesicle fibers, it might in part be due to the oat flour in the formulation. Oomah, B. C. (Baking and related properties of wheat-oat composite flours. Cereal Chem. 60(3): 220–225, 1983), found that as the concentration of oat flour increased from 5–25% in a composite wheat-oat flour combination, maximum torque decreased in the mixograph.

Oat flour has been recognized as a good source of vegetable protein, but the protein is inelastic. As a consequence, oat flour has always been regarded as unsuitable for use in the formation of "light" breads, rolls and similarly leavened products. Peiser and Livingston (U.S. #1,555,093 - Sept. 28, 1915), confirming this fact, claimed a blended cereal food product consisting essentially of 6 parts by weight of oat meal flour and 4 parts by weight of wheat gluten flour having a protein content of upward of 35%. If the protein content is less than this, the blended product will be deficient in binding properties, but with the product as claimed, it is able to be baked into a light raised bread. The combination flour has a calculated protein content of 23% of which the content of wheat gluten is 14%. Dietary fiber content was not available at the time of this invention but from current knowledge it would be similar to conventional bread.

The formula of Peiser et al. is similar to the Finnish, Kauraleipä or oat flour bread in which the ratio of oat flour to gluten flour is 6:4.5 (Kükönen, U., *Natural Cooking the Finnish Way.* Copyright 1974 by Ulla Käkönen. Published by Quadrangle/New York Times Book Company, New York, N.Y., and reproduced in *The Good Cook, Techniques and Recipes*; Breads, Time Life Books Inc., 1981, pg 91). The ratios of oat flour to gluten based upon the gluten content of the gluten flours used by Peiser et al. and in Kauraleipä are 4.3: 1 and 3.8:1, respectively. When an oat flour/gluten mixture was used as a protein supplement to the formula of Patton et al., the ratio of oat flour to gluten was 4:1.

Schaeffer et al. (U.S. #3,497,360 - Feb. 24, 1970) also utilized an oat flour-gluten mixture with soy flour as a supplement for a yeast bread having a minimum of wheat starch (about 8% of the dry ingredients), a high concentration of yeast (about 5% of the dry ingredients) and Jerusalem artichoke flour (at least 5% of the dry ingredients). The dough from which the bread is made is proofed once for a limited period, sufficient to substantially double the dough volume and is baked immediately. The ratio of oat flour to gluten in this formula is of the order of 4:1.

The gluten content based upon dry ingredient weight of these several formulae are as follows:
Peiser et al: 14%
Kauraleipä : 15%
Patton et al: 12.8%
Schaeffer et al: 9–16%

These gluten contents are comparable to those of high quality wheat flours. There is no evidence from this data that oat flour when admixed with wheat flour allows for a greater addition of gluten than could be accounted for by the dilution effect of the additives including the oat flour.

Oomah found a progressive decrease in loaf volume with increasing levels of oat flour addition to wheat flour over a range of 5–25%. These volume decreases were greater than could be accounted for on the basis of a dilution of the gluten content of the wheat flour. D'Appolonia and Youngs (D'Appolonia, B. L. and Youngs, V. L., Effect of bran and high protein concentrates from oats on dough properties and bread quality. Cereal Chem. 55(5): 736–741, 1978), found that wheat bran which was milled to a fineness not to pass a 60 mesh screen decreased bread volume 11% and 17% at 10% and 20% additive levels, respectively. The loaf volume changes with oat protein concentrate at the 10% and 20% levels were similar to those reported by Oomah. These protein concentrates were obtained by a wet milling process. (Cluskey, J. E., Wu, Y. V. et al., Oat protein concentrates from a wet-milling process. Cereal Chem 50(4): 475–480, 1973) and contained 8.3% nitrogen. A high protein fraction can be obtained also by a dry-milling milling of oat groats ( Musher, U.S. #2,355,028 - Aug. 1, 1944). This material contains in excess of 20% protein (Nx 6.25).

Oomah speculates that the reduction in loaf volume with an oat flour addition to wheat flour may be due to a complexing of oat and wheat protein. Globulin is the major protein of both soy and oat flour. Soy proteins and wheat proteins were reported to form complexes (Aidoo, E. S., High protein bread. Interaction of wheat proteins and soy proteins with surfactants in doughs and in model systems. PhD dissertation, Kansas State Univ., Manhattan, Kans., 1972 - cited by Oomah). This speculation is not consistent with the above data. Oomah and D'Appolonia report similar decreases of loaf volume with the same additive levels of oat product but the D'Appolonia high protein concentrate from oats has three times the protein content of the Oomah oat flour preparation. The similarity of the results in the two studies cannot be explained on the basis of an all or none reaction, as both studies give evidence of a graded response. Another mechanism must be sought.

Even though Musher (U.S. #2,355,030 - Aug. 1, 1944; U.S. #2,355,547 - Aug. 8, 1944; U.S. #2,395,060 - Feb. 19, 1946; U.S. #2,395,061 - Feb. 19, 1946; U.S. #2,487,069 - Nov. 8,1949) describes his product as a high protein fraction of oats, his uses of the product have been as a substitute for hydrophillic colloids or gums. It is now known that the viscous, gum-like characteristic of oatmeal resides with the soluble dietary fiber portion of the oat groat of which the major constituent is beta-D-glucan, a hemicellulose. (Seibert, S. E., Oat bran as a source of soluble dietary fiber. Cereal Foods World 32(8): 552–553, 1987). Beta-D-glucan is present to some extent in all oat groat materials but oat bran is a particularly good source. Oat bran has 10.5% soluble dietary fiber whereas rolled oats have 4.8% (Seibert).

The role of soluble dietary fiber, particularly that of oat and guar, in lowering serum cholesterol has led to its use in cholesterol reduction diets and as dietary supplements. Oat bran has been available in health food stores as a food supplement and has found commercial use in a ready-to-eat cereal (ex. Craklin Oat Bran, Kellog Company). It has been used as an additive to muffins and cookies. This has been possible because these products do not require a strong gluten structure. However, it has not found a place in bread or similar baked goods at nutritionally useful levels because of its inhibitory effect on bread volume and its negative effects on bread crumb and texture.

Krishnan et al. (Krishnan, P. G., Chang, K. C. and Brown, G., Effect of commercial oat bran on the characteristics of composition of bread. Cereal Chem, 64 (1): 55-58, 1987) using additions to wheat flour at 10% and 15% levels of commercial oat bran separated by particle size (U.S. Tyler) into overs #30 (large), overs #40 (medium) and throughs #40 (small) found that all substitutions created a decrease in bread volume, grain and texture scores as compared to a wheat flour loaf as control. These decreases were directly related to amount and inversely to particle size of the oat bran additions. Bread volume, grain and texture were improved by the use of potassium bromate. From the standpoint of sensory evaluation the 15% addition level of small particle oat bran was given the lowest score in all categories. A 15% substitution of wheat flour with oat bran would only provide 0.5 g of dietary fiber and 0.3 g of additional protein per 25 g slice of bread. It is apparent that for bread making, oat bran per se is not acceptable as an additive to wheat flour.

Ideally, a bread enriched with both wheat gluten and oat bran could supply the desired levels of protein and dietary fiber for nutritional purposes. In addition, increasing the gluten content of bread will (1) reduce the concentration of starch granules in the gluten matrix of the bread and (2) increase loaf volume with a concomitant effect on loaf softness. (Willhoft, E. M. A., Mechanisms and theory of staling of bread and baked goods and associated changes in textural properties. Texture Stud. 4: 292, 1973, cited by D'Appolonia, B. L. and Morad, M. M., Bread staling. Cereal Chem. 58 (3): 186-190, 1981). This has been thought to be the basis of the antifirming effect of increased gluten (protein) content of bread and the reported beneficial effect on staling.

D'Appolonia and Morad report that the time constants of breads (the time for any given fraction of material to be converted to the stale form) made from flours of different protein content demonstrates that the staling rate of bread is inversely related to the protein content of the flour. This data suggests that the staling rate is independent of protein quality, since two flours used in this study had similar time constants and protein contents but one of the flours had a significantly greater strength; its farinograph stability time was more than twice that of the other flour. This emphasizes the importance of the ratio of starch to protein in the dough in determining the rate of bread staling. They also show that the time constant of bread increased from 3.7 to 11.3 days over a range of wheat protein (gluten) content of from 11.0% to 21 6% of the dry mix (14% mb), a direct linear relationship.

Dubois (U.S. #3,219,455 - Nov. 23, 1965) describes the use of 20-30 parts of vital wheat gluten (below 20 parts, loaf volume decreases and above 30 parts, the grain becomes more open and poorer), 3-5 parts of hydrophillic colloid (synthetic or vegetable) and 0.01-0.025 parts of an oxidizing agent based upon 1000 parts of a bread flour to obtain a bread having increased loaf volume, improved grain, texture and keeping qualities. Compressibility as the index of firming was greater for the additive loaf at both 48 and 96 hours than for the control. However, the rate of change over this time period was the same for the additive and control groups indicating no effect on the basic mechanism of staling.

Jaeckering (U.S. #4,007,289 - Feb. 8, 1977) describes a steam leavened bread piece produced from a mixture of more than 30% and up to 70% by weight of vital gluten with an equilibrium moisture of 8-13% with cereal starch up to 100%. The dough had to be cut into pieces because the sticky, viscous dough prevented other methods of dough division. The material slices cleanly without crumb production and will retain the quality for months at a time without deterioration in taste. No information is given on methods used to prevent drying or microbiological contamination of the product. The product described in this invention is a steam expanded gluten ball. If this material were leavened by yeast or chemicals it would form an elastic balloon with little or no crumb structure. The use of steam leavening gives a more controlled expansion of the gluten network but the rubbery consistency persists giving an unsatisfactory crumb. There is no provision to deal with the dryness associated with gluten products. Finally, the product requires special processing and does not lend itself to the production of regular full sized bread loaves.

Banecki (Banecki H., Kleber-der entscheidende Faktor der Brotalterung (Gluten- the deciding factor in staling of bread) Getreide, Mehl und Brot 36 (10): 272-276, 1982) prepared wheat breads with starch-gluten ratios of from 80:4 to 64:20; in addition a gluten bread and starch doughs of moisture content 42.5%, 46.0% and 48.5% were baked. Crumb firmness measured with an Instron 1140 increased during the first 48 hours of storage. These changes were inversely related to the gluten content of the bread. The firmness of 64:20 bread after 48 hours was 37.2 Kg., while 80:4 bread had a similar firmness (34 Kg) after only 3 hours. During the first 48 hours of storage the baked starch dough was on the average 213 times more firm than the gluten only bread. Firmness of the gluten only bread increased the most during the 72 to 96 hour period of storage. Similar results were obtained by Banecki with other gluten breads having gluten:starch ratio of 80:4, 72:12 and 64:20 (Banecki, H., Effects of gluten on the aging process of bakery products. Zagadnienia Piekarstwa ZBPP 27(2): 1-9, 1982 (Polish)). Firmness increased most 72-96 hours after baking. Crumb firmness was inversely related to gluten content.

Although increasing the gluten content of bread lengthens its time constant and reduces the firmness associated with staling, in addition to its negative effect on user acceptability it also has a negative effect on keeping time.

Attempts to increase keeping time by substituting a portion of the water content with a polyhydric alcohol have been reported. Durst (U.S. #4,511,585 - Apr. 16, 1985) claims a lower moisture, storage stable, crumb-structured ready-to-eat cooked good made from a flour-containing base batter or dough, water and from 5% to about 15% by weight of the cooked good of a liquid edible polyhydric alcohol. The water activity of this cooked good being equal to or less than 0.85 and the ratio of water to liquid polyhydric alcohol being equal to or less than 4.8.

BRIEF SUMMARY OF THE INVENTION

The present invention relates to compositions of natural ingredients, more specifically a milled oat groat product and high gluten wheat flour, and methods of utilizing them to make both yeast and chemically leavened baked goods which do not stale and have extended keeping qualities and are nutritionally superior due to high protein and dietary fiber content. More in particular, the present invention relates to yeast and chemically leavened doughs which are high in protein and dietary fiber, to dry mixes of the said natural products derived from grains which may also contain one or more diluents of other natural grains from which said doughs can be prepared by the addition of liquid, to the products prepared from said doughs by baking and to methods of making such mixes, doughs and baked products, whereby all of said baked products do not stale and have extended keeping qualities. A composition of flours of the present invention includes gluten flour in amounts sufficient to produce a vital gluten content of at least 17% of the dry mix and a milled oat groat product in amounts sufficient to produce a soluble oat dietary fiber content of from 0.2% to 56.0% of the vital gluten content of the dry mix.

It is the object of this invention to produce a composition of flours having a high vital gluten content with a higher gluten to starch ratio than standard baking flours. These compositions can be formed, using standard procedures and equipment, into doughs convertible by yeast and/or chemical leavening into breads, rolls, muffins and similar baked goods, which are unique because they resist staling and are capable of having a prolonged shelf-life while avoiding the negative organoleptic properties associated with high gluten-containing baked goods.

It is a further object of this invention to provide baked goods of superior nutritional value due to their high protein and dietary fiber content; more specifically, a high soluble dietary fiber content.

DETAILED DESCRIPTION OF THE INVENTION

Staling of baked goods is of considerable economic importance since it limits the shelf-life to about four (4) days in the store and about equal time in the home. This short shelf-life requires wholesale bakeries to have separate distribution systems operating independently of other packaged food stuffs and limits the distribution area to a maximum radius of distances covered in a 24 hour time span. This makes the staling of baked goods the controlling factor in the operational programming of their manufacture and distribution. The staling process also prevents the stockpiling of such baked goods and prevents their use in such vital areas as disaster relief kits, field packs and mail order distribution.

The shelf-life of such baked goods is that interval from its completed production to the point when, because of feel, taste, odor or appearance, it is no longer acceptable to the user. The length of this interval is dependent upon staling, chemical stability of ingredients, retention of moisture content and maintenance of an acceptable moisture partition, retention of aromatics, maintenance of physical properties, including compressibility and friability (crispness) and contamination with microorganisms. Some of these factors can be managed by selection of ingredients, additives, processing and packaging materials and techniques. The staling process has remained the limiting factor in the prolongation of keeping time or shelf-life. The many approaches to the solution of this problem have thus far failed to provide anything but a few days extension of the shelf-life before the detection of the firming or staling characteristics.

Staling is a function of wheat starch. Although not perfectly understood, it involves the amylose and amylopectin in bread crumb, principally the amylose fraction. Apparently retrograde reactions cause the carbohydrate chains of amylose to associate or align over a period of time generating firmness and reduction in soluble dextrin which characterizes stale crumb.

Wheat flour obtained from the milling of wheat is a combination of starches, gluten proteins and to a lesser extent pentosans, lipids, fiber, vitamins and minerals. The major component is starch, but the gluten in flour, even though present to the extent of about one tenth that of starch, is essential to the making of breads and other leavened baked goods. Gluten, as it develops in the dough forms a chain-like molecular structure which creates an elastic network, trapping the carbon dioxide gas formed during leavening and expanding with it. In addition, this gluten network forms a matrix in which the starch granules are imbedded. Further, the water used to make the dough is held to a large part in the protein matrix. Gluten can take up more than twice the amount of water by weight as does undamaged starch.

As the temperature of the dough rises during baking, the gluten protein is denatured and loses much of its water-holding capacity. Concomitantly, the starch granules absorb water, swell and the starch gelatinizes. Some of the gelantinized starch is released from the swollen and ruptured starch granules to occupy intergranular spaces. Also, the released starch granules can form intermolecular associations which generate the firmness of structure associated with staling. The heat may also cause aggregation of the amylopectin. This aggregation involves intermolecular association of the side chains of the branched molecules of amylopectin, possibly through hydrogen bonds. Changes within the starch granules, the amylose fraction of starch, and the gluten itself all contribute to the staling process.

Since wheat starch is primarily responsible for the staling process, baked goods have been made of a flour containing wheat gluten in combination with a wheat starch substitute. This combination has produced baked goods capable of being manufactured by standard procedures, able to satisfy user specifications of appearance, flavor, texture, chew and mouth feel, with extended keeping qualities, and which do not stale.

These compositions consist of combinations of wheat gluten flour and one or more of milled oat bran, milled rolled oats or any milled oat groat product containing non-nutritive soluble oat dietary fiber in an amount of from 6.0% to 90.0% but preferably in the amount of from 7.0% to 30.0% of the vital gluten content of the dry mix. The amount of oat groat product used in the dry mix to obtain doughs and final baked products having the desired physical and nutritional characteristics depends further on the non-nutritive soluble dietary fiber content and the particle size of the oat groat material selected. The amount of the wheat gluten flour depends upon its vital gluten content which should not be less than 75% of the wheat gluten flour.

A dilution of vital gluten content below 75% of the wheat gluten flour with one or more of wheat flour, whole wheat flour, wheat bran, rye flour, Miller's bran flour or corn meal flour, while still providing useful compositions for making either yeast or chemically leavened baked products with the desired resistance to staling and a high nutritional value, create conditions which necessitate the use of a reduced amount of the soluble oat dietary fiber from about 0.2% to 25% of the vital gluten content of the dry mix. The amount of this reduction is directly proportional to the dilution of the vital gluten content. Such dilution of the vital gluten content also necessitates the use of an additional hydrophillic colloid such as a vegetable gum in the amount of from 0.5% to 3.5% of the dry mix. This addition maintains the hydrophillic colloid content of the mix at about 5% or more of its vital gluten content.

The growing concern about the effects of animal lipids and cholesterol, particularly in the pathogenesis of atherosclerosis and certain cancers and the difficulty of separating animal proteins from their associated saturated fats has increased the need and the search for alternatives to meat. Wheat proteins (gluten) are a valuable source of protein and their nutritional quality can be augmented by the addition of the limiting amino acid l-lysine. Breads and similar baked goods, because of their general use could become excellent food vehicles for wheat protein. In order to make this feasible, the level of gluten in bread would have to be increased by more than two-fold over currently available products. Standard breads, white, rye and whole wheat, contain about 2 g of protein per 25 g slice (8%). The average hamburger supplies 21 g of complete protein and 245 calories. It would take 11 slices of standard bread to supply a similar quantity of protein but with 720 calories. Additionally, most breads also contain saturated fats to improve texture and to soften the crumb. The protein to saturated fat ratio of some commercial breads is the same as standard hamburger. Since increasing the gluten content of bread reduces user acceptability, gluten bread has all but disappeared from the bakery shelf. Other vegetable protein additives are limited because of their negative effects on bread volume and crumb and therefore, on consumer acceptability.

The use of cellulostic filler to reduce the caloric content of bread has permitted the addition of gluten flour in amounts greater than 5%. This concept has resulted in a series of inventions, but the breads made using their techniques have not been able to combine caloric reduction with an increased gluten content and still provide a bread acceptable to the consumer and capable of being manufactured with existing equipment.

This invention not only provides a baked product with an increased gluten content and a reduction in total calories, but with the additional advantage of high fiber, specifically soluble dietary fiber, and with no saturated fats or cholesterol. These baked products are consumer acceptable and capable of being manufactured with existing methods and equipment.

Such products have far-reaching utility beyond the ordinary consumer and the health conscious, such as for nutritionally deprived people in underdeveloped countries or those subject to natural or war-caused disasters, those on diets which restrict dairy products for the elderly and non-ambulatory where high nutrition and high fiber are essential and for campers, hikers and others whose jobs require long periods in open country. Non-staling breads may be shipped or transported anywhere no matter how remote, and will arrive in fresh baked condition.

DESCRIPTION OF PREFERRED EMBODIMENTS

The results of the following series of experiments are important to obtain a more detailed description of the present invention. Using a straight-dough method, bread loaves were made from doughs prepared by the addition of salt, yeast nutrient, yeast and water to various flour mixes composed of wheat gluten flour, having a vital gluten content of at least 75% (GF75+) and one of three different oat groat products, oat bran, milled coarsely (overs U.S. #20), oat bran milled finely (throughs U.S. #40), both of which have a non-nutritive soluble dietary fiber content of 10.5%, or rolled oats, milled finely having a non-nutritive soluble dietary fiber content of 4.8%. After shaping and panning, the loaves were placed in a proofing cabinet at 37° C. for 2 hours. They were then baked in an oven at 200° C.

The specific volumes of these loaves after one hour of cooling are inversely proportional to the ratio of oat great product content to the vital gluten content of the flour mixes from which they are made (Table I column A/D). This relationship is an inverse linear logarithmic function. When the specific volumes of the loaves are made a function of the ratio of the non-nutritive soluble dietary fiber content to the vital gluten content of the flour mixes from which they are made (Table I column B/D), there is no difference in the suppression of loaf volume between the two oat groat products, rolled oats or oat bran, when each are milled to the same fineness (throughs U.S. #40). Whereas, based upon the same non-nutritive soluble dietary fiber content oat bran, coarsely milled (overs U.S. #20) is less potent in suppressing loaf volume. The relationship of loaf specific volume to the ratio of soluble oat dietary fiber and vital gluten content of the flour mixes is also an inverse linear logarithmic function, paralleling the previously described relationships using oat groat product content. These findings indicate that loaf volume suppression is a direct function of soluble oat dietary fiber content of the oat groat material and an inverse function of its particle size. Further, depending on the particle size of oat groat material used in these experiments, a range of soluble oat dietary fiber in an amount of from 7.0% to 30.0% in the vital gluten content of a flour mix composed of wheat gluten flour (75% or more vital gluten content) and a milled oat groat product will provide a useful range of bread loaf volumes.

The suppression of loaf volume by soluble oat dietary fiber is probably related to the inhibition of gluten strength. The following data will further the understanding of this invention from the standpoint of that inhibition of gluten strength by soluble dietary fiber contained in oat groats or products derived therefrom. If gluten flour with a 75% or greater vital gluten content (GF75+) is admixed with water, yeast and a yeast nutrient such as sucrose, a tough and rubbery doughball is readily formed. This doughball expands with yeast fermentation and continues to expand with baking forming a large ball-like structure which collapses upon cooling. When cut, this ball, with rubbery gluten walls, is hollow, lacking any of the cellular structure characteristic of bread. This structure could be likened to a collapsed balloon.

Wheat flour with a vital gluten content of approximately 12% can, under the known conditions of bread making, be made into an acceptable bread of varying quality. The addition of GF75+ to this wheat flour will result in changes in the dough and bread which are directly related to the amount of added GF75+. These changes consist of the development of increasingly tough, rubbery doughs difficult to work and after processing, breads with increasing gluten TM like characteristics such as open grain with irregular cell networks and gluten strands separating crust and crumb which range from coarse and tough to rubbery. There is a point herein designated the "Saturation Point", when the amount of added GF75+ will exceed the inhibitory effect of the wheat flour on the chemical bonding of the gluten molecules, resulting in a dough and baked loaf having the characteristics of pure GF75+ product described above. In these studies the "Saturation Point" was reached with a wheat starch to vital gluten ratio of 1.2.

Doughs and bread made from mixes of milled oat groat products and gluten flour (GF75+) will show trends similar to those described with wheat flour and gluten flour above, in that as the ratio of oat groat product to vital gluten decreases the dough becomes increasingly tough and non-workable and the bread crumb more gluten-like and rubbery until the "Saturation Point" is reached. Experiments were conducted with milled oat bran (throughs U.S. #40) as a milled oat groat product and GF75+, the results of which show a "Saturation Point" with an oat bran to vital gluten ratio of 0.24 and a soluble dietary fiber content to vital gluten content of 0.03. Comparing their relative "Saturation Points", this oat bran flour mixture is approximately 5 times more potent than the carbohydrate factor of wheat flour, but based on the non-nutritive soluble dietary fiber content of the oat bran, it is 40 times more potent in inhibiting the chemical bonding of the gluten molecules.

Whereas the "Saturation Point" reflects the gluten capacity of a given flour or the amount of vital gluten which can be assimilated, the amount of vital gluten addition giving workable doughs and acceptable breads is less. The amount of vital gluten which can be added to wheat flour of 12.5% gluten content is limited to about 3% of the flour by weight and the range of ratios of the carbohydrate fraction to vital gluten contents of wheat flour are 4.5 to 7.6 for vital gluten contents of 15.5% to 10% respectively. On the other hand, the range of ratios of oat groat products, based upon their non-nutritive soluble dietary fiber contents, to the vital gluten content of the flour mixes is from 0.05 to 0.60 for vital gluten content of the flour mixes of 46.8% to 15% respectively. Not only do oat groat products have a greater capacity for vital gluten than does the carbohydrate fraction of wheat flour but they also permit a wider range of vital gluten additions while still maintaining the necessary characteristics for workable doughs and acceptable breads. Soluble oat dietary fiber appears to have a dual action, using its effect on bread volume as an index. Specific volumes (y) of loaves made from flour mixes of milled oat groat products (throughs U.S. #40) and gluten flour (GF75+) having a ratio of soluble dietary fiber to vital gluten content (x) of 0.07 to 0.20 follow the relationship of $$y = m \frac{1}{\log x}$$

where the slope is $(-)$ 5.8 $\pm$ 0.2 indicating a communality of cause and effect. Ratios (x) greater than 0.20 and up to 0.80 produce a lesser rate of specific volume decrease and although the relationship follows that of $$y = m \frac{1}{\log x}$$

the slope is $(-)$ 1.5 $\pm$ 0.06 indicating a decreased potency of the soluble dietary fiber or the introductions of another effect, antagonistic to its weakening effect on gluten. The latter is the more probable and possibly represents the effect of oat soluble dietary fiber acting as a hydrophillic colloid to strengthen the gluten cell network to gas expansion.

Determining the acceptability of a bread suffers from the subjectivity of the process of evaluation. This is complicated by the fact that everyone (gluten sensitive individuals excepted) has lengthy if not diverse experience with bread consumption, and thereby becomes a self proclaimed expert, if not connoisseur. The diversity of bread types but the narrowness of individual experience puts an additional bias on the sensory evaluation of any bread differing from the mass-produced white loaf. Most would not choose a pumpernickel bread over a standard white loaf, although each loaf by itself would be considered acceptable.

There have been efforts made in bread evaluation to use objective measurements such as compression, shred and color indices. However, unless these indices are set to an established norm for a given type of bread they may be of little value or even have a negative value except when used to follow serial changes in similar batches. For example, the compression index, although used in serial evaluation of bread aging or indirectly, staling, has helped create norms for overly soft, compressible loaves by not measuring rates of change but rather making absolute comparisons between control and treated loaves at given points in time. It should be emphasized that loaf compression is a one dimensional aspect of staling, failing to speak to changes in crumb, texture, slicing characteristics, aroma, taste and mouth sensation. It was for these reasons that an evaluation system was designed to score bread using different categories involving visual, tactile and oral sensations, including taste and aroma. An on/off (yes/no) system is used for most categories, limiting the numerical range from (+) 1 to (−) 1. Where (0) is used, it was decided that the feature or subset would be non-contributory either positively or negatively. In some categories there may be subsets on the positive and/or negative side creating a (+) 2 and/or (−) 2 rating. When there is a (−) 2 in any categories the result is sufficiently drastic to score the bread unacceptable. This evaluation method scores a loaf as acceptable (excellent, good, fair) or unacceptable. It does not require a scaled rating within a category, but only the recognition of a subset designation. It is not biased by bread type. It can detect and eliminate stale loaves. Using this bread evaluation system (Table II) the loaves described in Table I were scored. All but the loaves from two mixes were found to be acceptable (excellent, good or fair).

The nutritional advantages of this invention lie in the protein and dietary fiber contents of the flour mixes used in the above experiments (Table III). Breads made from these flour mixes are a rich source of protein and soluble oat dietary fiber. As an example, two 22.5 g slices of a bread made from flour sample #5, (oat bran overs #20), will supply about 12 g of protein and 4.9 g of non-nutritive dietary fiber, approximately 20% of an adult male's daily requirements of these nutrients. It should be emphasized that the dietary fiber is of oat origin which is particularly important in the management of elevated levels of serum cholesterol. The two slices of the bread mentioned above supply 1.6 times the oat dietary fiber as a serving of oatmeal. If the flour is enriched with 1-lysine the protein value of the flour would be enhanced making these breads a valuable source of non-animal protein.

The keeping quality of breads made from the mixes in Table I were evaluated using the Bread Scoring Index (Table II). After baking, the loaves were depanned and cooled at room temperature for one hour. They were placed in polyethylene bags (0.002 in. thickness) and closed either with a self closure seal or a metal tie. Based upon crust and slicing characteristics, texture, crumb moistness, aroma, flavor and mouth feel (items #2,4,8,9,10,11 and 12, Table II) the loaves remained free of staleness at the end of a 30 day period of observation.

Since mold retardants were not used in these flour mixes, mold growth was noted in a large percentage of loaves during the course of the test period. In addition, since there were no special precautions to prevent moisture loss, loaf shrinkage was noted, particularly in the breads made from mixes with vital gluten contents above 40%. Both of these conditions are manageable by techniques known to the art and would not preclude the possibility of attaining a shelf-life of from several months to two years.

D'Appolonia and Morad ( D'Appolonia, B. L., and Morad, M. M., Bread Staling; Bread Chem. 58(3): 186–190, 1981) showed a direct relationship between staling time (3.7 to 11.3 days) and wheat protein content of the flour mix (11.0% to 21.6%). In contrast, the bread loaves made from mixes of GF75+ (gluten flour, 75% vital gluten, minimum) and milled oat groat products and having a varying vital gluten content of from 20.8 to 52 1% (Tables I and III) showed no evidence of staling over the 30 day period of observation. This non-linear response of time constant to protein content of these flour mixes indicates that the combinations of GF75+ and milled oat groat products produce an anti-staling effect in bread which is not directly related to the vital gluten content of the flour mixes and this combination of ingredients has anti-staling properties which are both surprising and unpredictable. Since these various mixes have a 5% or less wheat starch content, the question is then raised as to whether or not the addition of wheat flour in any amount to the combinations of GF75+ and milled oat groat product will alter their anti-staling properties. This was investigated using graded dilutions of the combination of GF75+ and milled oat groat products with all purpose wheat flour (APF) from 10–90% (unadjusted for moisture content) of the mix.

Using a straight-dough method, bread loaves were made from doughs prepared by the addition of salt, yeast nutrient, yeast and water to various flour mixes composed of GF75+ (wheat gluten flour, having a vital gluten content of at least 75%), one of three oat groat products, oat bran milled coarsely (overs U.S. #20), oat bran milled finely (throughs U.S. #40), both having a non-nutritive soluble dietary fiber content of 10.5%, or rolled oats milled finely (throughs U.S. #40) having a non-nutritive soluble dietary fiber content of 4.8% and all purpose wheat flour (vital gluten content of 12.5%). After shaping and panning, the loaves were placed in a proofing cabinet at 37° C. for 2 hours. They were then baked in an oven at 200° C. The specific volumes were measured by volume displacement after one hour of cooling. The data for the finely milled oat bran and rolled oats are presented in Tables IV and V respectively. Results with the coarsely milled oat bran parallel those of the finely milled oat bran except for the effect imposed by the reduced release of non-nutritive soluble dietary fiber from the larger particle size material and therefore are not included here.

It was found that for a given dilution of GF75+ with all purpose flour the ratios of the contents of non-nutritive soluble oat dietary fiber to total vital gluten are inversely proportional to loaf specific volume and the relationship can be described by the function $$y = m \frac{1}{\log x}$$

where y is the loaf specific volume and x is the ratio of soluble oat dietary fiber to total vital gluten content. The curve parallels the curve developed for milled oat groat products and GF75+ without wheat flour dilution, indicating a similarity of the mode of action of the soluble oat dietary fiber in the two types of mixes (diluted and undiluted). However, the addition of wheat flour to GF75+ potentiates the effect of oat soluble oat dietary fiber on loaf volume, reducing its requirements and the ratio of the soluble dietary fiber to total vital gluten content. This reduction in the ratio of soluble oat dietary fiber to total vital gluten content is directly related to the dilution of GF75+ by all purpose wheat flour and for oat bran it can be described by the general equation $y = mx + b$ where y is the ratio of the content of soluble oat dietary fiber to the total vital gluten content of the mix and x is the ratio of the total vital gluten to the all purpose wheat flour content adjusted for its moisture and its vital gluten content (primarily wheat starch), b equals a constant which is less than zero and m is a variable coefficient inversely proportional to the loaf specific volume (S V), described by the equation $$SV = a \frac{1}{\log m}.$$

When milled rolled oats (throughs U.S. #40) are used instead of oat bran, the reduction in the ratio of the content of soluble oat dietary fiber to the content of total vital gluten of the flour mix necessitated by the dilution of GF75+ by all purpose flour is directly proportional to the amount of that dilution. This relationship is not linear but approximates the general equation $y = m \log x$, where y is the ratio of the content of oat soluble dietary fiber to the total vital gluten content of the mix and x is the ratio of the total vital gluten content to the content of all purpose flour corrected for its moisture and its vital gluten content represented as a percentage and m is a variable coefficient inversely proportional to the loaf volume.

The relationship between the x and y functions between 70% and 90% dilution show a potentiation of loaf volume inhibition by the action of ingredients in wheat flour on the soluble dietary fiber derived from rolled oats similar to that noted for oat bran over the same range of dilutions with all purpose wheat flour. Lower levels of dilution (10–60%) with wheat flour show a greater potentiation of this gluten inhibiting effect with rolled oats than with oat bran. This would indicate that unlike oat bran there are other components in rolled oats, one of which is soluble oat dietary fiber, which interacts with ingredients in wheat flour to inhibit gluten bonding. No matter the mechanism of action, the dilution of a flour mixture consisting of a milled oat groat product and gluten flour (75% vital gluten, minimally) with a wheat flour, such as all purpose flour, necessitates the use of a reduced amount of non-nutritive soluble oat dietary fiber, from about 0.2% to 25% of the vital gluten content of the dry mix in order to maintain the required characteristics of the resulting doughs and baked products.

The loaves described in Table IV and V had characteristics of a white wheat flour loaf. Those loaves with specific volumes greater than 5.5 had a more open grain and were more elastic in both resistance to slicing and shred than loaves with specific volumes less than 5.5. Using the Bread Scoring Index (Table II) for evaluation, all loaves were acceptable, ranging between a numerical rating of 12 and 17.

Anti-staling and keeping qualities of bread loaves were evaluated with flour compositions of milled oat bran (throughs U.S. #40) and GF75+ (gluten flour, 75% vital gluten content, minimally) and various dilutions of all purpose wheat flour ( vital gluten content 12.5%), the majority being from 60% to 90% of the dry mix, unadjusted for moisture content. Bread was made from doughs prepared by the straight-dough method. Yeast, yeast nutrient, salt and water were combined with the flour ingredients. After formation, the doughs were divided into 55.5 g portions to meet packaging requirements, then shaped and placed in a proofing cabinet at 37° C. for 2 hours. Following this, they were baked in an oven at 200° C. for 15 minutes. Immediiately after baking the small loaves were depanned directly into preformed bags made from polyethylene film ( 0.002 in. thickness). The bags were closed directly with a self-closure seal, or heat sealed. Packaged loaves were stored in open bins at 23° C. for periods up to 6 months. Loaves were examined at 1 day after moisture equilibrium, at 5-7 days and 10-18 days after baking and packaging. Thereafter loaves were examined at irregular intervals up to 6 months. Loaves were scored using the Bread Scoring Index (Table II). Only loaves having a score of 13 or more at day 1 were retained for further evaluation.

For periods of up to 60 days of observation loaves made using the range of dilutions with all purpose wheat flour and packaged in sealed polyethylene bags remained soft and compressible and sliced cleanly without crumbling. The crumb was moist and shredded with normal elasticity; aroma and flavor were good. Bread was rated unstaled and acceptable with a score of 11 or better. However, all loaves showed a reduction in the Bread Score Index of 2 points which was due to a transient sensation of dryness with each bite of bread. This was first noted at the 5-7 day period of observation with loaves made using the 80% dilution and as early as one day with the 90% dilution with all purpose wheat flour; and it was additionally observed in the 10-14 day period of observation with loaves made with 60% and 70% dilutions.

It was found that this sensation of dryness was associated with gluten enrichment of wheat bread and can be perceived as early as day 1 after baking. It is probably related to moisture migration from the protein gel to the starch gel of bread. Its perception is related to the ratio of gluten to starch. It is not a factor in regular wheat flours having a starch to gluten ratio from about 4.5 to 6. As the ratio approaches 4 this transient sensation of dryness is reported. Although noted with the loaves made from the flour mixes containing GF75+ and milled oat groat product diluted with all purpose flour, this dryness showed a delay in its first appearance which was directly related to the amount of soluble oat dietary fiber, a hydrophillic colloid. Since soluble oat dietary fiber is a potent inhibitor of gluten protein bonding, increasing its content without a concomitant increase in vital gluten content results in a reduction in loaf volume and even unsatisfactory loaves.

The addition of guar gum to a composition of flours consisting of GF75+ and milled roll oat (throughs U.S. #40) diluted by all purpose wheat flour (70% by weight) demonstrates that guar gum has significantly less effect on loaf volume (inhibition of gluten protein bonding) than the same amount of soluble oat dietary fiber. The addition of 1.25 parts guar gum to a flour mix consisting of milled rolled oats, GF75+ and all purpose flour increases the soluble fiber content of the flour mixture about 6 times, but the observed effect (actual specific volume) could be produced with about a 2 times increase in soluble oat dietary fiber. Thus, soluble oat dietary fiber is about 3 times more potent than guar gum in inhibiting gluten protein bonding.

On the other hand, vegetable gums, such as guar gum, take up about 26 times their weight in water, in contrast to soluble oat dietary fiber which takes up about 13 times its weight. Thus, guar gum is about 2 times more potent a hydrophillic colloid as soluble oat dietary fiber. The separation of these two effects, gluten inhibitory and hydrophillic colloidal, in two different directions in the two materials, soluble oat dietary fiber and vegetable gum, offers a means to control the undesirable effects of gluten when combined with other baking flours with the possibility of retaining the desirable ,features of gluten. A combination of soluble oat dietary fiber and vegetable gum such as guar gum could provide a proper balance between gluten inhibition and hydrophillic colloidal properties to permit at least a 17% vital wheat gluten content in baking flours such as wheat, whole wheat, rye, corn or bran flours or combinations thereof. Breads made from such combinations would exhibit prolonged anti-staling properties and would not produce the unsatisfactory aspects of crumb toughness and dryness characteristic of breads with a starch to gluten ratio of about 4 or less.

The use of vegetable gum by itself in combination with gluten flour in amounts sufficient to alter the keeping quality of bread fails to provide the necessary characteristics for an acceptable bread. Loaves made from a flour with a vital gluten content of about 17% of the dry mix and guar gum in the amount of 1.5% of the dry mix were found to be unacceptable because of separation of crust and crumb. Similarly, loaves of bread made from a flour mix with a gluten content of about 17% of the dry mix and an soluble oat dietary fiber content of 0.05% of the dry mix were found to be unacceptable because of a dry sensation upon eating and a slight separation of crust and crumb. Surprisingly, loaves of bread made from a flour with a vital gluten content of about 17% of the dry mix, an soluble oat dietary fiber content of 0.04% of the dry mix and guar gum in the amount of 1.5% of the dry mix produced acceptable loaves with a Bread Score Index of 13 or more. Importantly, there was no separation of crust and crumb and a moist sensation when eaten. Rather than being an additive effect to worsen crumb-crust integrity the combined action of guar gum and soluble oat dietary fiber was to preserve it.

Using a straight-dough method, bread was made from doughs prepared by combining flour mixes consisting in various amounts of milled rolled oats or milled oat bran (throughs U.S. #40), GF75+ (gluten flour, 75% vital gluten content, minimally), all purpose wheat flour (12.5%, vital gluten content) and guar gum (2.5 parts for 100 part of dry mix) with water, yeast, yeast nutrient (sucrose) and salt. In addition, rye loaves were prepared using, in place of all purpose wheat flour, a flour mixture of rye flour and all purpose wheat flour in a ratio of 1/1.6. After the dough was formed it was divided into 55.5 g pieces, for convenience of packaging, shaped, proofed for 2 hours at 37° C. and baked for 15 minutes at 200° C. Immediately after baking the loaves were depanned directly into bags made of polyethylene film (0.002 in. thickness), heat sealed and stored in open bins at 23° C. for up to 4 months. Periodically loaves were examined and evaluated using the "Bread Score Index" (Table II).

The initial evaluation Day 1-3 showed all loaves to be excellent (15-17) except the 90% dilution loaves which showed irregular cellular structure in some loaves. There was a further reduction in the "Bread Score Index" of the 90% dilution beginning in the Day 7 interval. This was attributed to a slight dry sensation with the initial bite. This also developed in the 80% dilution loaves at a later time, the Day 14-17 interval. This was the same phenomenon noted at Day 1-2 in the 90% dilution, day 5-7 in the 80% dilution and day 10-14 in the 60% and 70% dilution loaves not containing guar gum. Thus the guar gum delayed the onset of this dry sensation for about 7 days for the 80% and 90% dilution loaves. The 60% and 70% dilution loaves with guar gum never developed this negative feature. Since the ratio of total soluble fiber content to total vital gluten content for the 80% and 90% dilution loaves was greater than for the 60% and 70% dilution loaves (see Table VI), a soluble dietary fiber content of at least 5% of the vital gluten content is not the complete answer to prolonged keeping qualities. A further examination of the relationships of these flour mixes shows that the 60% and 70% dilution loaves also have a total soluble dietary fiber content of 5% or more of the APF starch content while the 80% and 90% dilution loaves have a total soluble fiber content of less than 5% of the APF starch content, 4.5% and 3.9% respectively. It should be noted that none of these loaves made with mixes of from 60% through 90% dilution were stale. They were compressible, cut cleanly without crumbling, remained moist and did not have a stale taste or give a mouth sensation of staleness. The dry sensation reported here is due to the moisture migration between the protein and the wheat starch gels and can be controlled by the soluble dietary fiber content of the flour mix. The onset of the effect is directly related to the soluble dietary fiber content as a function of both the total vital gluten content and the wheat starch content of the flour mix. In order to have bread loaves with keeping times of 60 days or more, the soluble dietary fiber content (soluble oat fiber and vegetable gum) must be at least 5% of the wheat starch content of the flour mix.

The decrease in "Bread Score Index" in the Day 50-60 interval in the Rolled Oat Series at the 70-90% dilution was due to a perceptible change in aroma from that of fresh wheat bread to a nutty aroma (glutenlike). This was not seen with the 60% dilution loaves. A decrease in "Bread Score Index" was noted also in the Day 14-17 interval for all dilutions (60-90%) in the Oat Bran Series. This was due to a change in flavor from bread-like or grain-like to a sour taste. Finally, those loaves examined at the Day 120 interval showed surface dryness which further reduced the "Bread Score Index".

Polyethylene film (0.002 in.) of which these bread storage bags were made is not impermeable to gas and moisture transmission. The progressive development of the dry sensation, in 7 days in the 90% dilution loaves progressing to surface dryness by the Day 120 interval, is consistent with a decreasing moisture content, not just moisture migration. The slight changes in flavor and aroma noted above are consistent with gas transmission and with loss of aromatics either by diffusion from the package or oxidation by oxygen entering the package. Oxidation of other ingredients, gluten flour and oat bran, is known to change flavor under conditions of storage which permit air contact.

There is a need for a bread with prolonged keeping qualities of one year minimally but preferably two years in order to supply a missing ration for field packs. However, in addition to keeping quality, of which absence of staling is a major factor, there are additional features, not supplied by currently available breads, which should be incorporated into this bread to contribute to its nutritional qualities. These include a high protein, low fat (no animal fat) and high non-nutritive dietary fiber content to improve intestinal function and bowel regulation and reduce dangers associated with high saturated fat and cholesterol intake. Due to these considerations, and based upon the previously described specifications to prevent staling, a flour mix was developed having the following composition:

| Ingredients | Parts |
| --- | --- |
| Wheat Bran (Miller's Bran - throughs U.S. #40) | 105 |
| Oat Bran (throughs U.S. #40) | 24 |
| Gluten Flour (Vital Gluten Content 75% "GF75+") | 110 |
| Guar Gum | 6 |

To this flour mix the following ingredients were added as flavoring agent:

| Ingredients | Parts |
| --- | --- |
| Onion Powder | 4-8 |
| Carraway Seeds | 5-9 |
| Salt | 3-5 |
| Brown Sugar | 15-35 |

Since these loaves were intended for packaging in containers resistant to oxygen transmission, with the original environment of the sealed containers being low in oxygen and with no special product sterilization employed, a water activity (Aw) of 0.81 or lower was thought to be essential to prevent microbial growth, particularly the anaerobic variety. In preliminary studies it was found that the us cf water alone to form a dough from this flour mix led to a bread having a water activity (Aw) of about 0.85. Substituting a glycerol-in-water solution of one volume glycerol to 9 volumes of water (10% glycerol solution) for plain water in the dough preparation led to bread having an Aw of 0.81 or less with the bread having a water to glycerol ratio of 7 or greater.

Fifteen (15) pounds of the above described flour and flavor ingredients were added to 197 ounces of glycerol-in-water solution (19.7 ounces of glycerol in 177.3 ounces of water) with the appropriate amount of yeast and formed into a dough (straight-dough method). The dough was divided into 46 g pieces, shaped and fit into special pans which would yield a baked piece (mini-loaf, 3"×2"×2") designed to fit into a field ration pack. Following proofing at 36° C. for up to 2 hours, the loaves were baked at 200° C. for 13–15 minutes. Immediately after baking, the loaves were depanned directly into preformed bags made of an aluminum foil, polyethylene colaminate (0.004 in. thickness). Excess air was expressed and the bags were heat sealed. A partial vacuum was formed upon cooling of the loaves.

The packaged loaves were stored in open bins at about 23° C. in an ambient humidity (40–50%) for over two years. Loaves examined after 27 months of storage remained as fresh and edible as when first baked. There was no staling.

In keeping with the specifications of the invention the vital gluten content was 29.7% of the dry mix and the soluble dietary fiber content, of which soluble oat dietary fiber was a part, was 10.3% of the vital gluten content and 17% of the starch content of the dry mix.

The 40 g bread piece would supply 8 4 g of protein and 4.8 g of dietary fiber, about 12% and 20% respectively of the daily requirements of these nutritional elements. In addition the total fat content was less than 1 g of which there was no animal fat.

In addition to the packaging in aluminum foil, polyethylene colaminate bags as above, dough was also put directly into tinned cans for proofing. The cans were closed with a lid but not sealed and placed in an oven at 200° C. for 25 minutes. Immediately after baking the lids were sealed and the cans allowed to cool. The canned bread was kept for two years and remained fresh without staling with the same aroma and flavor as when newly baked.

A straight-dough method was used in the above studies as a matter of experimental convenience, but other methods of dough formation can be used including a continuous dough process. These mixes, particularly those from which breads having a specific volume of 5.5 or less are made, closely resemble wheat flour doughs in workability. Similarly, in order to optimally control these experiments and to establish relationships between composition of mixes and the physical, eating and keeping qualities of the resulting bread, the use of oxidizing agents, conditioners, mold retardants, etc., was avoided. However, the use of such agents in this invention is not precluded and the expected results from their use should be achieved.

Bread loaves and rolls (mini-loaves) were used as the baked goods to evaluate the end points of the above described studies because these products are the most demanding of wheat flour and wheat flour mix performance. Other yeast leavened products such as pizzas, English muffins and bagels have been made using these flours. They are interchangeable as far as product formation is concerned with those made of bread flours having the normal range of vital gluten content.

Chemically leavened formulations have also been made using the flour mixes of this invention. In this regard, the most important are Irish soda bread which differs from regular wheat bread only in the type of leavening agent (baking soda instead of yeast) and Graham bread, which uses graham flour in combination with wheat bread flour. Muffins which employ a modified batter containing shortening and eggs can be made with the various flours of this invention.

EXAMPLE I

| Blend | |
|---|---|
| Gluten flour (GF75+) | 30 g |
| Oat Bran (throughs U.S. #40) | 80 g |
| Baking Powder | 15 g |
| Grated Orange Peel | 10 g |
| Sugar | 50 g |
| Salt | 2 g |
| Add | |
| Margarine (melted) | 15 g |
| 1 egg (beaten) | — |
| Orange Extract | 8 cc |
| Milk | 100 cc |

Mix thoroughly, pour into greased muffin tins and bake at 165° C. for 25 minutes.

The resulting muffins have a light texture and excellent mild orange flavor which make them highly acceptable. A fruit muffin may be prepared with the addition of blueberries or pineapple.

Nutritionally one 75 g muffin contains:

| Protein | 11.2 g |
|---|---|
| Fat (Total) | 5.0 g |
| (Animal Fat) | (1.2 g) |
| Dietary Fiber (Total) | 5.0 g |
| (Oat Soluble Fiber) | (2.1 g) |

Muffins are less structured than bread or rolls and do not need flours with as great a gluten strength. The above formulation for muffins uses a flour with a ratio of oat soluble dietary fiber to total vital gluten of 0.37. A bread made from this flour would have a specific volume of slightly less than 4, a result consistent with strong gluten inhibition. Similarly if muffins are to be made from a flour in which the GF75+ is diluted by another flour such as an all purpose wheat flour, the ratio of soluble oat dietary fiber to total vital gluten content which should be used is one that would produce a bread with a specific volume of about 4.

EXAMPLE II

| Blend | |
|---|---|
| Gluten Flour (GF75+) | 50 g |
| Oat Bran (throughs U.S. #40) | 50 g |
| All Purpose Flour (vital gluten 12.5%) | 50 g |
| Guar Gum | 3 g |
| Baking Powder | 15 g |
| Grated Orange Peel | 10 g |
| Sugar | 50 g |
| Salt | 2 g |
| Add | |
| Margarine (melted) | 15 g |
| 1 egg (beaten) | — |
| Orange Extract | 8 cc |
| Milk | 100 cc |

Mix thoroughly, pour into greased muffin tins and bake at 205° C. for 17 minutes The muffins made as per Example II had an excellent appearance, aroma, texture and flavor. Nutritionally they were equivalent to the GF75+, oat bran flour muffin (Muffin I).

Muffins made with the flour compositions of this invention do not stale and have the potential for prolonged keeping time. However, the use of eggs, milk and polyunsaturated fats in muffins necessitates processing and packaging requirements different from those for bread made in accordance with the invention. Unsaturated vegetable fats are used in the preparation of these muffins because these fats do not have the same potential for cardiovascular and cancer risk as do saturated animal fats. Unsaturated vegetable fats develop rancidity by oxidation with exposure to air. Bakers use lard (saturated animal fat) despite the negative health implications in order to solve the problem of rancidity and maintain a shelf-life specification. This is an unsatisfactory solution, particularly from the stand point of this invention, the object of which in part is to produce a nutritionally superior baked piece. Reduction or elimination of the oxygen environment in which the baked goods are packaged prevents the development of rancidity of an unsaturated fat. Therefore, the use of packaging materials having a reduced or limited oxygen transmission combined with nitrogen flushing of the package before closure will reduce the possibility of rancidity. In addition, antioxidants, such as Vitamin E offer further protection against rancidity.

Milk and particularly eggs which introduce and support the conditions for microbial growth create a potential problem of safety. The normal baking process does not raise the interior temperature of a baked piece sufficiently to sterilize it. Reduction of the water activity (Aw) below 0.85 lessens the chance of microbial growth but without proven sterilization procedures the risk of bacterial contamination and food toxicity from baked pieces containing eggs and milk packaged under conditions of long term storage with reduced oxygen tensions is too great to permit commercial feasibility. Other than sterilization of the final product, elimination of milk and eggs from batter formulations remains the best option for reducing the risk while still maintaining a reasonable price structure.

Whole eggs contribute to the binding capacity of batter through the action of the albumen of the white and a softening or texturizing effect on the crumb due to the lipid action of the yolk. Milk protein softens the crumb. Both milk and eggs impart flavor and contribute to the protein nutritional value of the product. However, egg yolks because of their high cholesterol and fat contents also have a negative nutritional effect. Soluble oat dietary fiber possesses unique combinations of properties discoverd in these studies. These are adhesiveness (hydrophilic colloidal property) which permits the development of batters without the use of egg albumin for its binding properties and crumb softening (gluten molecular bonding inhibition) which gives a texturizing effect to the crumb without the use of egg yolk or milk solids.

A flour, composed of oat bran or a similarly milled oat groat product and GF75+ (gluten flour, vital gluten content, 75%+) alone or diluted with another type of baking flour and with the diluent flour a vegetable gum such as guar gum, according to the invention, blended with a chemical leavening agent such as baking powder and/or baking soda and sugar and the combination mixed with vegetable shortening (unsaturated fat) and water forms a batter which upon baking is converted into a muffin having an excellent shape and a moist, soft crumb and with the addition of spices and fruit, such as raisins, a flavor and aroma comparable to a fruit cake.

EXAMPLE III

| Blend | |
|---|---|
| Gluten Flour (GF75+) | 40 g |
| Oat Bran (throughs U.S. #40) | 90 g |
| Baking Powder | 10 g |
| Baking Soda | 5 g |
| Cinnamon | 1 g |
| Allspice | 1 g |
| Nutmeg | 0.3 g |
| Salt | 1 g |
| Add | |
| Brown Sugar | 90 g |
| Corn Oil | 35 g |
| Water | 120 cc |

Mix thoroughly, pour into greased muffin tins and bake at 200° C. for 17 minutes. (Raisins which have been lightly floured may be folded into the batter).

For short term storage, up to 4 weeks, the muffins are depanned immediately after baking into preformed bags made of polyethylene film (0.002 in. thickness) which have been flushed with nitrogen gas. The filled bag is then closed by heat sealing. Longer term storage requires a packaging film resistant to gas transmission and the use of glycerol in water solution (1:10) to form the batter. The resulting muffins have a water to glycerol ratio of 6 or greater and an Aw of 0.85 or less.

As previously described the gluten flour (GF75+) component of the flour mix may be diluted with a variety of baking flours such as wheat flour, rye flour, milled corn meal flour, whole wheat flours, wheat bran or milled Miller's bran flour, or combinations thereof. For example, the addition of Miller's Bran and all purpose flour to the GF75+ and oat bran flour in the muffin formula (Example III) was used in Example IV.

EXAMPLE IV

| Blend | |
|---|---|
| Gluten Flour (GF75+) | 50 g |
| Miller's Bran (throughs U.S. #40) | 30 g |
| All Purpose Flour (vital gluten 12.5%) | 40 g |
| Guar Gum | 3 g |
| Baking Powder | 10 g |
| Baking Soda | 5 g |
| Cinnamon | 1 g |
| Allspice | 1 g |
| Nutmeg | 0.3 g |
| Salt | 1 g |
| Add | |
| Brown Sugar | 90 g |
| Corn Oil | 35 g |
| Water | 120 cc |

Mix and Bake as in Example III.

TABLE I

THE RELATIONSHIP OF BREAD SPECIFIC VOLUME TO OAT SOLUBLE DIETARY FIBER AND GLUTEN CONTENT

| | Exp. # | A* Oat Groat Product | B* Soluble Fiber | C* Gluten Flour GF75+ | D* Vital Gluten | A/D | B/D | Number of loaves | Specific Volume cc/g | S.D. |
|---|---|---|---|---|---|---|---|---|---|---|
| Oat Bran | 1. | 60 | 6.3 | 100 | 75 | 0.8 | 0.08 | 6 | 6.3 | 0.28 |
| (throughs U.S. | 2. | 86 | 9.0 | 114 | 86 | 1.0 | 0.10 | 6 | 6.0 | 0.50 |

TABLE I-continued

THE RELATIONSHIP OF BREAD SPECIFIC VOLUME TO OAT SOLUBLE DIETARY FIBER AND GLUTEN CONTENT

|  | Exp. # | A* Oat Groat Product | B* Soluble Fiber | C* Gluten Flour GF75+ | D* Vital Gluten | A/D | B/D | Number of loaves | Specific Volume cc/g | S.D. |
|---|---|---|---|---|---|---|---|---|---|---|
| #40) | 3. | 80 | 8.4 | 80 | 60 | 1.3 | 0.14 | 6 | 4.9 | 0.34 |
|  | 4. | 100 | 10.5 | 64 | 48 | 2.1 | 0.22 | 6 | 4.0 | 0.21 |
|  | 5. | 100 | 10.5 | 100 | 75 | 1.3 | 0.14 | 1 | 4.8 | — |
|  | 6. | 120 | 12.6 | 80 | 60 | 2.0 | 0.21 | 1 | 4.2 | — |
|  | 7. | 140 | 14.7 | 60 | 45 | 3.1 | 0.33 | 1 | 3.6 | — |
|  | 8. | 160 | 16.8 | 40 | 30 | 5.3 | 0.56 | 1 | 3.4 | — |
|  | 9. | 162 | 17.0 | 29 | 22 | 7.4 | 0.77 | 1 | 3.1 | — |
| Oat Bran | 1. | 80 | 8.4 | 80 | 60 | 1.3 | 0.14 | 6 | 6.2 | 0.27 |
| (overs U.S. | 2. | 90 | 9.5 | 70 | 53 | 1.7 | 0.18 | 6 | 4.9 | 0.24 |
| #20) | 3. | 96 | 10.1 | 64 | 48 | 2.0 | 0.21 | 6 | 4.9 | 0.24 |
|  | 4. | 100 | 10.5 | 58 | 44 | 2.3 | 0.24 | 6 | 4.6 | 0.21 |
|  | 5. | 108 | 11.3 | 52 | 39 | 2.8 | 0.29 | 6 | 4.2 | 0.27 |
|  | 6. | 108 | 11.3 | 52 | 39 | 2.8 | 0.29 | 6 | 4.0 | 0.21 |
| Rolled Oats | 1. | 90 | 4.3 | 70 | 53 | 1.7 | 0.08 | 6 | 6.3 | 0.45 |
| (throughs U.S. | 2. | 100 | 4.8 | 55 | 41 | 2.4 | 0.12 | 6 | 5.0 | 0.26 |
| #40) | 3. | 108 | 5.2 | 52 | 39 | 2.8 | 0.13 | 6 | 4.7 | 2.3 |
|  | 4. | 120 | 5.8 | 40 | 30 | 4.0 | 0.19 | 6 | 4.0 | 0.23 |

*all weights measured in grams
S.D. - Standard Deviation

TABLE II

METHOD OF BREAD LOAF EVALUATION USING A BREAD SCORING INDEX*

1. Crust Color
   Carmel Brown (+) 1, Light Brown 0, Other (−) 1
2. Crust Characteristics
   Crusty (+) 1, Soft Crust (+) 1, Dry (−) 1, Wrinkled (−) 2, Deteriorated (−) 2
3. Loaf Shape
   Symmetrical (+) 1, Asymmetrical 0, Shrinkage (−) 1, Collapse (−) 2
4. Slicing Characteristics
   a. Clean (+) 1, Crumbling (−) 1
   b. Resistance (+) 1, Compressible (−) 1, Rigid (−) 2
5. Grain
   Fine (+) 2, Open (+) 1, Dense (−) 1, None (−) 2
6. Cellular Structure
   Uniform (+) 1, Irregular 0, Crust Separation (−) 2, Absent (−) 2
7. Shred
   Elastic (+) 1, Pasty (−) 1, Rubbery (−) 1, Crumbly (−) 2
8. Texture
   Soft, Velvety (+) 2, Soft, Smooth (+) 1, Pasty 0, Coarse, Tough (−) 1, Hard (−) 2
9. Aroma
   Bread-like (+) 1, Flat 0, Off (−) 1, Unpleasant (−) 2
10. Flavor
    Grain-like (+) 1, Flat 0, Off (−) 1, Unpleasant (−) 2
11. Mouth Feel
    a. Moistness — Moist (+) 1, Dry (−) 1
    b. Chew — Chewable (+) 1, Pasty or Soggy (−) 1, Brittle (−) 2
    c. Softness — Soft (+) 1, Chewy or Rubbery (−) 1, Hard (−) 2
    d. Adherence to Mouth Parts — Clean (+) 1, Adherent (−) 1

*SCORING INDEX
EXCELLENT    15–17
GOOD         13–14
FAIR         11–12
UNACCEPTABLE <11 (A (−) 2 In any category is unacceptable)

TABLE III

PROTEIN AND DIETARY FIBER CONTENT OF THE FLOUR MIXES USED IN TABLE I

|  | Exp. # | Vital* Gluten | Total* Protein | Dietary* Fiber |
|---|---|---|---|---|
| Oat Bran | 1. | 52 | 61 | 9 |
| (throughs U.S. | 2. | 48 | 57 | 11 |
| #40) | 3. | 42 | 53 | 12 |
|  | 4. | 33 | 46 | 15 |
|  | 5. | 42 | 53 | 12 |
|  | 6. | 33 | 47 | 15 |
|  | 7. | 25 | 41 | 17 |
|  | 8. | 17 | 35 | 20 |
|  | 9. | 13 | 32 | 21 |
| Oat Bran | 1. | 42 | 53 | 12 |
| (overs U.S. | 2. | 37 | 49 | 14 |
| #20) | 3. | 33 | 47 | 15 |
|  | 4. | 31 | 45 | 15 |
|  | 5. | 27 | 42 | 17 |
|  | 6. | 27 | 42 | 17 |
| Rolled Oats | 1. | 37 | 46 | 6 |
| (throughs U.S. | 2. | 29 | 44 | 7 |
| #40) | 3. | 27 | 39 | 7 |
|  | 4. | 21 | 34 | 8 |

*Percent by weight of dry mix

TABLE IV

BREAD SPECIFIC VOLUME - A FUNCTION OF OAT SOLUBLE DIETARY FIBER TO VITAL GLUTEN CONTENT

Flours composed of milled oat bran (throughs U.S. #40) and GF75+ diluted with All Purpose Flour

| Exp. # | Dilution % | Soluble Fiber Total Gluten | Total Gluten Wheat Starch | Specific Vol. cc/g | Std. Dev. (N = 6) |
|---|---|---|---|---|---|
| 1. | 90 | 0.003 | 0.23 | 6.4 | 0.37 |
| 2. | 90 | 0.005 | 0.27 | 5.6 | 0.24 |
| 3. | 80 | 0.006 | 0.41 | 6.4 | 0.23 |
| 4. | 80 | 0.008 | 0.40 | 6.0 | 0.34 |
| 5. | 70 | 0.010 | 0.57 | 6.4 | 0.45 |
| 6. | 70 | 0.021 | 0.53 | 5.1 | 0.29 |
| 7. | 50 | 0.019 | 1.05 | 6.2 | 0.29 |
| 8. | 40 | 0.028 | 1.42 | 6.0 | 0.27 |
| 9. | 30 | 0.023 | 2.19 | 7.2 | 0.14 |
| 10. | 20 | 0.106 | 2.41 | 5.3 | 0.36 |

TABLE V

BREAD SPECIFIC VOLUME - A FUNCTION OF
OAT SOLUBLE DIETARY FIBER TO
VITAL GLUTEN CONTENT
Flours composed of milled rolled oats (throughs U.S. #40)
and GF75+ diluted with All Purpose Flour

| Exp. # | Dilution % | Soluble Fiber Total Gluten | Total Gluten Wheat Starch | Specific Vol. cc/g | Std. Dev (N = 6) |
|---|---|---|---|---|---|
| 1. | 90 | 0.002 | 0.27 | 5.9 | 0.24 |
| 2. | 90 | 0.005 | 0.26 | 5.0 | 0.23 |
| 3. | 80 | 0.007 | 0.38 | 6.3 | 0.41 |
| 4. | 80 | 0.010 | 0.37 | 6.0 | 0.25 |
| 5. | 70 | 0.011 | 0.52 | 6.8 | 0.22 |
| 6. | 70 | 0.015 | 0.49 | 6.4 | 0.21 |
| 7. | 60 | 0.015 | 0.69 | 6.6 | 0.48 |
| 8. | 60 | 0.019 | 0.74 | 6.2 | 0.19 |
| 9. | 50 | 0.016 | 0.96 | 6.3 | 0.13 |
| 10. | 40 | 0.019 | 1.31 | 6.4 | 0.33 |
| 11. | 30 | 0.026 | 1.81 | 6.1 | 0.29 |
| 12. | 20 | 0.043 | 2.53 | 5.6 | 0.20 |
| 13. | 10 | 0.074 | 4.35 | 5.0 | 0.29 |

TABLE VI

KEEPING TIME OF BREAD FROM MIXES OF
MILLED OAT
DILUTED WITH ALL PURPOSE FLOUR

| | Exp. # | Dilution # | Soluble Oat Fiber Total Vital Gluten | Total Soluble Fiber Total Vital Gluten | Bread Score Index Day: | | | | | | |
|---|---|---|---|---|---|---|---|---|---|---|---|
| | | | | | 1–3 | 7 | 14–17 | 25–35 | 50–60 | 75 | 120 |
| Rolled Oats | 1. | 60 | 0.012 | 0.092 | 15–17 | 15–17 | 15–17 | — | 15–17 | — | — |
| (throughs | 2. | 70 | 0.010 | 0.102 | 15–17 | 15–17 | — | — | 13–15 | — | 13–15 |
| U.S. #40) | 3. | 80 | 0.006 | 0.116 | 15–17 | 15–17 | — | 13–15 | 11–13 | — | unacc. |
| | 4. | 90 | 0.002 | 0.139 | 13–15 | 11–13 | — | — | 9–11 | — | unacc. |
| | 5. | 60* | 0.012 | 0.097 | 15–17 | 15–17 | — | 15–17 | 15–17 | 15–17 | 13–15 |
| Oat Bran | 1. | 60 | 0.023 | 0.089 | 15–17 | 15–17 | 13–15 | — | 13–15 | — | — |
| (throughs | 2. | 70 | 0.013 | 0.101 | 15–17 | — | 13–15 | — | 13–15 | — | — |
| U.S. #40) | 3. | 80 | 0.005 | 0.109 | 15–17 | — | 13–15 | 13–15 | 13–15 | — | — |
| | 4. | 90 | 0.002 | 0.136 | 13–15 | — | 11–13 | 11–13 | unacc. | | |

*Rye Flour/All Purpose Flour (1/1.6)

I claim:

1. A composition of flours comprising gluten flour in amounts sufficient to produce a vital gluten content of at least 17% of the dry mix and a milled oat groat product in amounts sufficient to produce a soluble oat dietary fiber content of from 0.2% to 56.0% of the vital gluten content of the dry mix.

2. A composition of flours as in claim 1 comprising gluten flour having a vital gluten content of 75% minimally and a milled oat groat product in amounts sufficient to produce a soluble oat dietary fiber content of from 8.0% to 56.0% of the vital gluten content of the dry mix.

3. A composition of flours as in claim 1 wherein the oat groat product is one or a combination of milled oat bran and milled rolled oats.

4. A composition of flour as in claim 1 comprising gluten flour having a vital gluten content of 75% minimally; another baking flour in amounts of from 10% to 90% of the dry mix; a milled oat groat product in an amount sufficient to produce a soluble oat dietary fiber content of from 0.2% to 10.6% of the vital gluten content of the dry mix; and a vegetable gum in an amount ranging from 0.5% to 3.5% of the dry mix.

5. A composition of flours as in claim 4 wherein the other baking flour is one or a combination of wheat flour, rye flour, milled corn meal flour, whole wheat flour or milled miller's bran flour.

6. A composition of flours as in claim 4 wherein the vegetable gum is guar gum.

7. A dough prepared by the addition of a liquid and a leavening agent to the composition of flours as in claim 1.

8. A dough as in claim 7 wherein the leavening agent is yeast.

9. A baked piece prepared by baking the dough as in claim 8 which has risen through yeast fermentation prior to baking.

10. A dough as in claim 7 wherein a chemical leaving agent is used.

11. A baked piece prepared by baking the dough as in claim 10 which has risen through chemical leavening action prior to and during baking.

12. A dough as in claim 7 wherein the liquid is water.

13. A baked piece prepared by baking the dough as in claim 12 which has been leavened.

14. A dough as in claim 7 wherein the liquid is a 10% glycerol in water solution.

15. A baked piece prepared by baking the dough as in claim 14 which has been leavened.

16. A method of making a baked piece which comprises:
preparing a dough as in claim 7, 8, 10, 12 or 14;
baking the dough;
immediately depanning the baked piece; and
packaging the baked piece.

17. A batter prepared by the addition of a liquid and a leavening agent to the composition of flours as in claim 1.

18. A batter as in claim 17 wherein a chemical leavening agent is used.

19. A baked piece prepared by baking a batter as in claim 18 which has risen through chemical leavening action prior to and during baking.

20. A batter as in claim 17 wherein the liquid is milk.

21. A baked piece prepared by baking a batter as in claim 20 which has been leavened.

22. A batter as in claim 17 wherein the liquid is milk and eggs.

23. A baked piece prepared by baking a batter as in claim 22 which has been leavened.

24. A batter as in claim 17 wherein the liquid is water.

25. A baked piece prepared by baking a batter as in claim 24 which has been leavened.

26. A baked piece prepared by baking a batter as in claim 24 which has been leavened.

27. A batter as in claim 17 wherein the liquid is a 10% glycerol in water solution.

28. A method of making a baked piece which comprises:
preparing a batter as in claim 17, 18, 20, 22, 24 or 27;
baking the batter;
immediately depanning the baked piece; and
packaging the baked piece.

* * * * *

UNITED STATES PATENT AND TRADEMARK OFFICE
CERTIFICATE OF CORRECTION

PATENT NO. : 4,961,937

DATED : October 9, 1990

INVENTOR(S) : Harry W. Rudel

It is certified that error appears in the above-identified patent and that said Letters Patent is hereby corrected as shown below:

Column 7, line 37, "Kukonen" should read --Kakonen--.
Column 7, line 44, "4.3: 1" should read --4.3:1--.
Column 8, line 22, delete "milling", second occurance.
Column 9, line 54, "21 6%" should read --21.6%--.
Column 14, line 66, "gluten TM like" should read --gluten-like--.
Column 17, line 28, "2I.6%" should read --21.6%--.
Column 17, line 32, "52 1%" should read --52.1%--.
Column 18, bridging lines 46-47, "oat soluble" should read --soluble oat--.
Column 23, line 22, "8 4 g" should read --8.4g--
Column 26, EXAMPLE IV, after the line that reads "Gluten Flour (GF75+) 50g", insert as a new line, --Oat Bran (throughs U.S. #40) 30g--.

Columns 27-28, TABLE I-continued, under column entitled S.D., line 16, "2.3" should read --0.23--.
Columns 29-30, TABLE VI, in the title, line 2, after "MILLED OAT", insert --GROAT PRODUCT, GF75+, GUAR GUM--.

UNITED STATES PATENT AND TRADEMARK OFFICE
CERTIFICATE OF CORRECTION

PATENT NO. : 4,961,937

DATED : October 9, 1990

INVENTOR(S) : Harry W. Rudel

It is certified that error appears in the above-identified patent and that said Letters Patent is hereby corrected as shown below:

Columns 29-30, TABLE VI, under column entitled Dilution, "#" should read --%--.

Signed and Sealed this

Eighteenth Day of August, 1992

Attest:

DOUGLAS B. COMER

Attesting Officer     Acting Commissioner of Patents and Trademarks